(12) United States Patent
Fears et al.

(10) Patent No.: US 9,215,123 B1
(45) Date of Patent: Dec. 15, 2015

(54) DNS REQUESTS ANALYSIS

(71) Applicants: Erik D. Fears, San Francisco, CA (US); Srinivas Avirneni, Austin, TX (US); Kendall S. Jones, Saratoga, CA (US)

(72) Inventors: Erik D. Fears, San Francisco, CA (US); Srinivas Avirneni, Austin, TX (US); Kendall S. Jones, Saratoga, CA (US)

(73) Assignee: Nominum, Inc., Redwood City, CA (US)

( * ) Notice: Subject to any disclaimer, the term of this patent is extended or adjusted under 35 U.S.C. 154(b) by 181 days.

(21) Appl. No.: 13/839,331

(22) Filed: Mar. 15, 2013

(51) Int. Cl.
*G06F 15/16* (2006.01)
*H04L 29/06* (2006.01)

(52) U.S. Cl.
CPC ................................ *H04L 29/06047* (2013.01)

(58) Field of Classification Search
USPC .......................................... 709/203, 225, 228
See application file for complete search history.

(56) References Cited

U.S. PATENT DOCUMENTS

| | | | |
|---|---|---|---|
| 6,961,783 B1 | 11/2005 | Cook et al. | |
| 7,046,659 B1 | 5/2006 | Woundy | |
| 7,600,042 B2 | 10/2009 | Lemson et al. | |
| 8,095,685 B2 | 1/2012 | Mattila | |
| 8,549,118 B2 | 10/2013 | Ringen | |
| 8,554,933 B2 | 10/2013 | Delos Reyes et al. | |
| 8,707,429 B2 | 4/2014 | Wilbourn et al. | |
| 8,762,506 B2 * | 6/2014 | Courtney et al. | 709/222 |
| 8,769,060 B2 | 7/2014 | Avirneni et al. | |
| 8,874,662 B2 | 10/2014 | Graham et al. | |
| 8,996,669 B2 | 3/2015 | Liu et al. | |
| 2002/0143705 A1 | 10/2002 | Kaars | |
| 2005/0060535 A1 | 3/2005 | Bartas | |
| 2005/0111384 A1 | 5/2005 | Ishihara et al. | |
| 2006/0168065 A1 | 7/2006 | Martin | |
| 2007/0058792 A1 * | 3/2007 | Chaudhari et al. | 379/88.17 |
| 2009/0067331 A1 * | 3/2009 | Watsen et al. | 370/235 |
| 2009/0144419 A1 | 6/2009 | Riordan et al. | |
| 2009/0296567 A1 | 12/2009 | Yasrebi et al. | |
| 2010/0030914 A1 | 2/2010 | Sparks et al. | |
| 2010/0106854 A1 | 4/2010 | Kim et al. | |
| 2010/0121981 A1 | 5/2010 | Drako | |
| 2010/0131646 A1 | 5/2010 | Drako | |
| 2010/0211628 A1 | 8/2010 | Shah | |
| 2010/0303009 A1 | 12/2010 | Liu | |

(Continued)

OTHER PUBLICATIONS

Park, Jeong-Hyun, "Wireless Internet access for mobile subscribers based on the GPRS/UMTS network," Communications Magazine, IEEE, vol. 40, No. 4, pp. 38-49, Apr. 2002.

(Continued)

*Primary Examiner* — Jude Jean Gilles
(74) *Attorney, Agent, or Firm* — Carr & Ferrell LLP

(57) ABSTRACT

Provided are computer-implemented methods and systems for analyzing domain name system requests and developing profiles associated with these requests. Multiple requests received from the same internet protocol (IP) address may be analyzed to differentiate computer systems used to generate these requests, applications provided on these computer systems, and even different users. The requests are analyzed based on text string content (e.g., domain and subdomain names) and timing. One or more profiles are developed and continuously updated based on requests received from the same IP address. These profiles may be used in real time to provide feedback to the users (e.g., deliver marketing content) or for subsequent analysis of comprehensive data sets (e.g., to identify behavior patterns). For example, a profile may be used to identify a number and types of computers in the household, a number and demographic information of users, and other such identifiers.

21 Claims, 5 Drawing Sheets

(56) References Cited

U.S. PATENT DOCUMENTS

| | | | |
|---|---|---|---|
| 2011/0213967 A1* | 9/2011 | Wnuk | 713/158 |
| 2011/0246634 A1 | 10/2011 | Liu et al. | |
| 2011/0296171 A1* | 12/2011 | Fu et al. | 713/156 |
| 2011/0296172 A1* | 12/2011 | Fu et al. | 713/156 |
| 2012/0036241 A1 | 2/2012 | Jennings et al. | |
| 2012/0178416 A1 | 7/2012 | Miklos et al. | |
| 2012/0198034 A1 | 8/2012 | Avirneni et al. | |
| 2012/0246315 A1* | 9/2012 | Kagan | 709/225 |
| 2012/0254996 A1 | 10/2012 | Wilbourn et al. | |
| 2013/0333016 A1* | 12/2013 | Coughlin et al. | 726/9 |
| 2014/0052984 A1* | 2/2014 | Gupta | 713/162 |
| 2014/0123222 A1* | 5/2014 | Omar | 726/3 |

OTHER PUBLICATIONS

Vixie et al., "Secret key Transaction Authentication for DNS (TSIG)," Network Working Group, May 2000, http://tools.ietf.org/pdf/rfc2845.pdf.

* cited by examiner

DNS REQUESTS ANALYSIS

FIELD

This application relates generally to data processing and more specifically to systems and methods for analyzing domain name system (DNS) requests.

BACKGROUND

The DNS is a hierarchical distributed naming system that associates certain information (e.g., IP addresses) with domain names assigned to each of the participating entities. Specifically, the DNS resolves queries for these names (e.g., into IP addresses) for the purpose of locating computer services and devices worldwide. The DNS effectively translates human-friendly computer hostnames into IP addresses. Users take advantage of this when they recite meaningful Uniform Resource Locators (URLs) and e-mail addresses without having to know how the computer actually locates the services. For example, a user enters a text string corresponding to a domain name, and based on this information, the request is send to a corresponding IP address or, more specifically, to a computer system associated with that IP address.

SUMMARY

Provided are computer-implemented methods and systems for analyzing domain name system requests and developing profiles associated with these requests. Multiple requests received from the same IP addresses may be analyzed to differentiate computer systems used to generate these requests, applications provided on these computer systems, and even different users. The requests are analyzed based on text string content (e.g., domain and subdomain names) and timing. One or more profiles are developed and continuously updated based on requests received from the same IP address. These profiles may be used in real time to provide feedback to the users (e.g., deliver marketing content) or for subsequent analysis of comprehensive data sets (e.g., to identify behavior patterns). For example, a profile may be used to identify a number and types of computers in the household, a number and demographic information of users, and other such identifiers.

In some embodiments, a computer-implemented method for analyzing web address system requests involves receiving a text string from a networked device associated with an IP address. Some examples of networked devices include a set top box, a laptop, a tablet, a game console, a mobile phone, and an appliance. The text string is associated with a web address. That is, the text string may include the domain name and other components of the web address. The method may proceed with analyzing content and timing of the text string. This analysis generates analysis output that is used for updating a profile associated with the IP address. The method may also involve repeating the receiving, analyzing, and updating information operations for a new text string received from the same networked device.

In some embodiments, the profile involves one or more of the following characteristics: a device type associated with the IP address, a number of devices associated with the IP address, an application installed on one or more devices associated with the IP address, a geographic location of the networked device, and one or more user profiles associated with the IP address. User profiles may involve one or more of a behavior profile, demographic profile, and interest profile. In some embodiments, multiple user profiles may be associated with the same IP address. Each one of these user profiles may correspond to a different user.

In some embodiments, the profile includes a pattern configured to predict timing and content of future text strings. In these embodiments, the method may involve applying the pattern for various tasks, such as suggesting content, prefetching content, and auto-filling forms. In some embodiments, the method involves repeating the receiving, analyzing, and updating information for a new text string received from a different networked device. The different networked device may be associated with the same IP address as the networked device. For example, the same household may use multiple computer systems. In other embodiments, the different networked device is associated with a different IP address than the networked device. As such, the service may be provided for multiple households (for example, anyone who has an account with a particular internet service provider). In the same or other embodiments, the method may involve developing an aggregate profile based on multiple profiles associated with different IP addresses. For example, multiple profiles may be integrated to extract certain marketing data and for other purposes.

In some embodiments, the method involves transmitting content to the networked device. The content selected may be based on the profile associated with the IP address. For example, marketing content, tailored content, or suggested content may be provided to the networked device. In some embodiments, the method also involves sharing content of the profile with a third party. This feature may be monetized by the service provider. In some embodiments, the process may involve analysis of the profile based on the text string received from the networked device. This analysis may be used, for example, to determine to which one of the multiple profiles associated with the same IP address this text string should be linked. In some embodiments, the profile includes multiple text strings and the corresponding times of receiving each of the multiple text strings. In other words, the profile may include a weblog, which may be analyzed in real time or at some later time.

Also provided is a computer-implemented system for analyzing web address requests. The system may include a communication module for receiving text strings from one or more networked devices. The devices may be associated with one or more corresponding IP addresses, while the text strings are each associated with a web address. The system also includes a processing module for analyzing content and timing of the text strings and generating analysis outputs. The system then includes a profile updating module for updating profiles based on the analysis outputs. Each profile may be associated with the corresponding IP address. The system may also be an aggregation module for developing an aggregate profile based on multiple profiles associated with different IP addresses. In some embodiments, the system includes a profile analysis module for performing analysis of each profile associated with the corresponding IP address based on the text string received from the networked device associated with the IP address.

Provided also is a machine-readable medium involving instructions, which when implemented by one or more processors, perform the following operations. One of these operations involves receiving a text string from a networked device associated with an IP address. The text string may be associated with a web address. Other operations involve analyzing content and timing of the text string, wherein analyzing generates analysis output. The profile associated with the IP address is then updated based on the analysis output.

BRIEF DESCRIPTION OF DRAWINGS

Exemplary embodiments are illustrated by way of example and not limitation in the figures of the accompanying drawings, in which like references indicate similar elements.

DETAILED DESCRIPTION

Provided are computer-implemented methods and systems for analyzing DNS requests and developing profiles associated with these requests. Multiple requests received from the same IP address may be analyzed to differentiate computer systems used to generate these requests, applications provided on these computer systems, and even different users. The requests are analyzed based on text string content (e.g., domain and subdomain names) and timing. One or more profiles are developed and continuously updated based on requests received from the same IP address. These profiles may be used in real time to provide feedback to the users (e.g., deliver marketing content) or for subsequent analysis of comprehensive data sets (e.g., to identify behavior patterns). For example, a profile may be used to identify a number and types of computers in the household, a number and demographic information of users, and other such identifiers.

The following detailed description includes references to the accompanying drawings, which form a part of the detailed description. The drawings show illustrations in accordance with exemplary embodiments. These exemplary embodiments, which are also referred to herein as "examples," are described in enough detail to enable those skilled in the art to practice the present subject matter. The embodiments can be combined, and other embodiments can be formed, by introducing structural and logical changes without departing from the scope of what is claimed. The following detailed description is, therefore, not to be taken in a limiting sense and the scope is defined by the appended claims and their equivalents.

In this document, the terms "a" or "an" are used, as is common in patent documents, to include one or more than one. In this document, the term "or" is used to refer to a nonexclusive "or," such that "A or B" includes "A but not B," "B but not A," and "A and B," unless otherwise indicated. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

Figure 1:
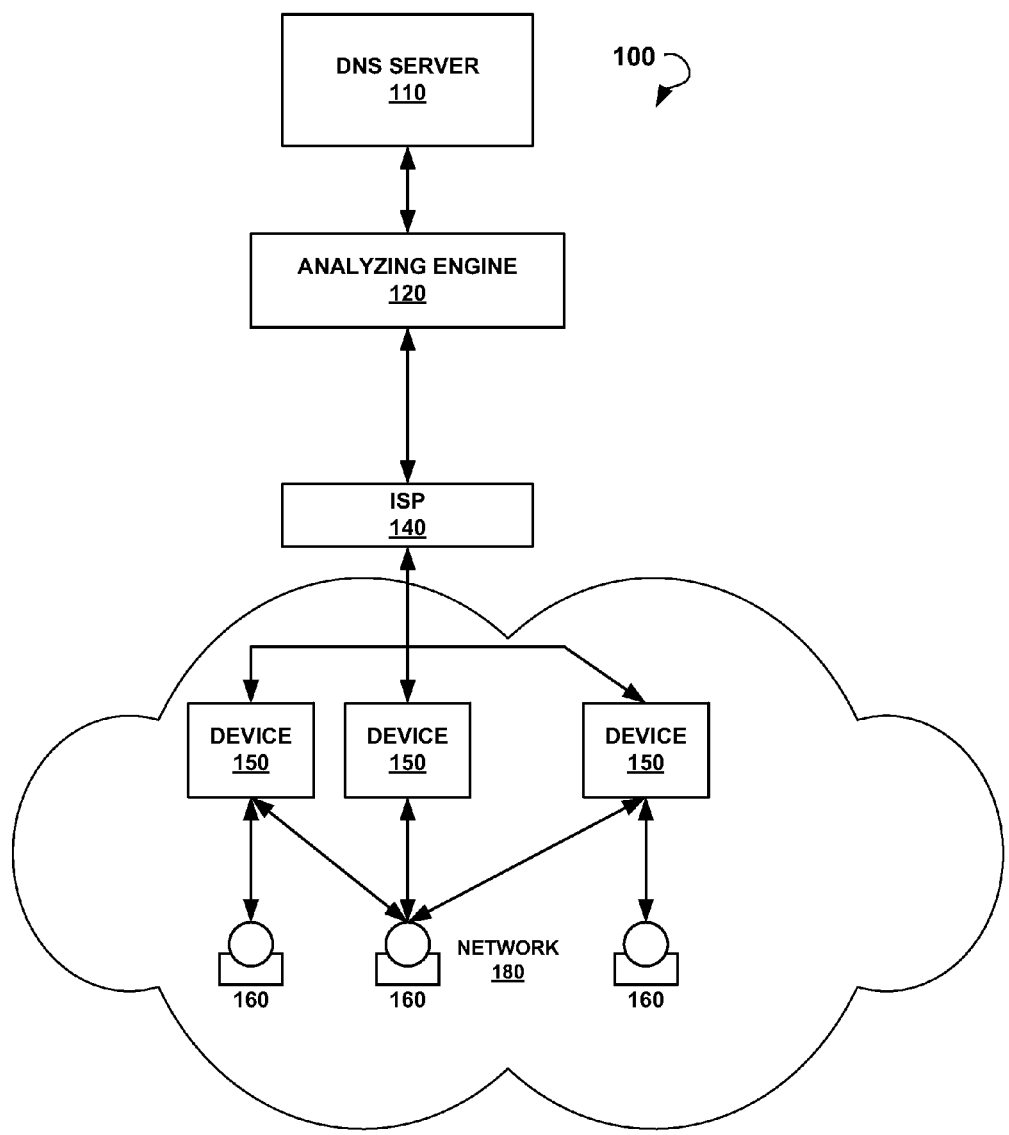
FIG. 1 is a block diagram of an Internet Server Provider (ISP) environment.

FIG. 1 is a block diagram of an ISP environment 100. A DNS server 110 and ISP 140 may be configurable to operate in conjunction with an analyzing engine 120. The analyzing engine 120 may be configurable to analyze content and timing of text strings associated with web addresses and to perform other operations described below.

The network 180 may be a home network or some other network with a shared IP address. The network 180 may be provided via an Internet router and installed within a household that has one or more users 160 and one or more networked devices 150. All users 160 within the same network 180 may share the same account with the internet service provider 140.

Networked devices 150 may be any type of device capable of accessing the Internet and transmitting web domains. Some examples of networked devices 150 include set up boxes, laptops, tablets, mobile phones with local network connectivity (e.g., WiFi), networked appliances (e.g., networked refrigerator, HVAC system), and gaming consoles. Some networked devices 150 may be shared by multiple users 160, while other devices may be used only by one user 160.

When one of the networked devices 150 transmits a text string provided by one of users 160 or generated automatically by one of the devices 150 (e.g., checking for software updates), the string may be first forwarded to the ISP 140, which then transmits it to the corresponding DNS server 110. The string may be intercepted along the way by the analyzing engine 120. In some embodiments, the analyzing engine 120 may be implemented at the DNS server 110, at the ISP 140, or both. In the same or other embodiments, the analyzing engine 120 may be implemented on the router of the network 180 or even on individual networked devices.

Figure 2:
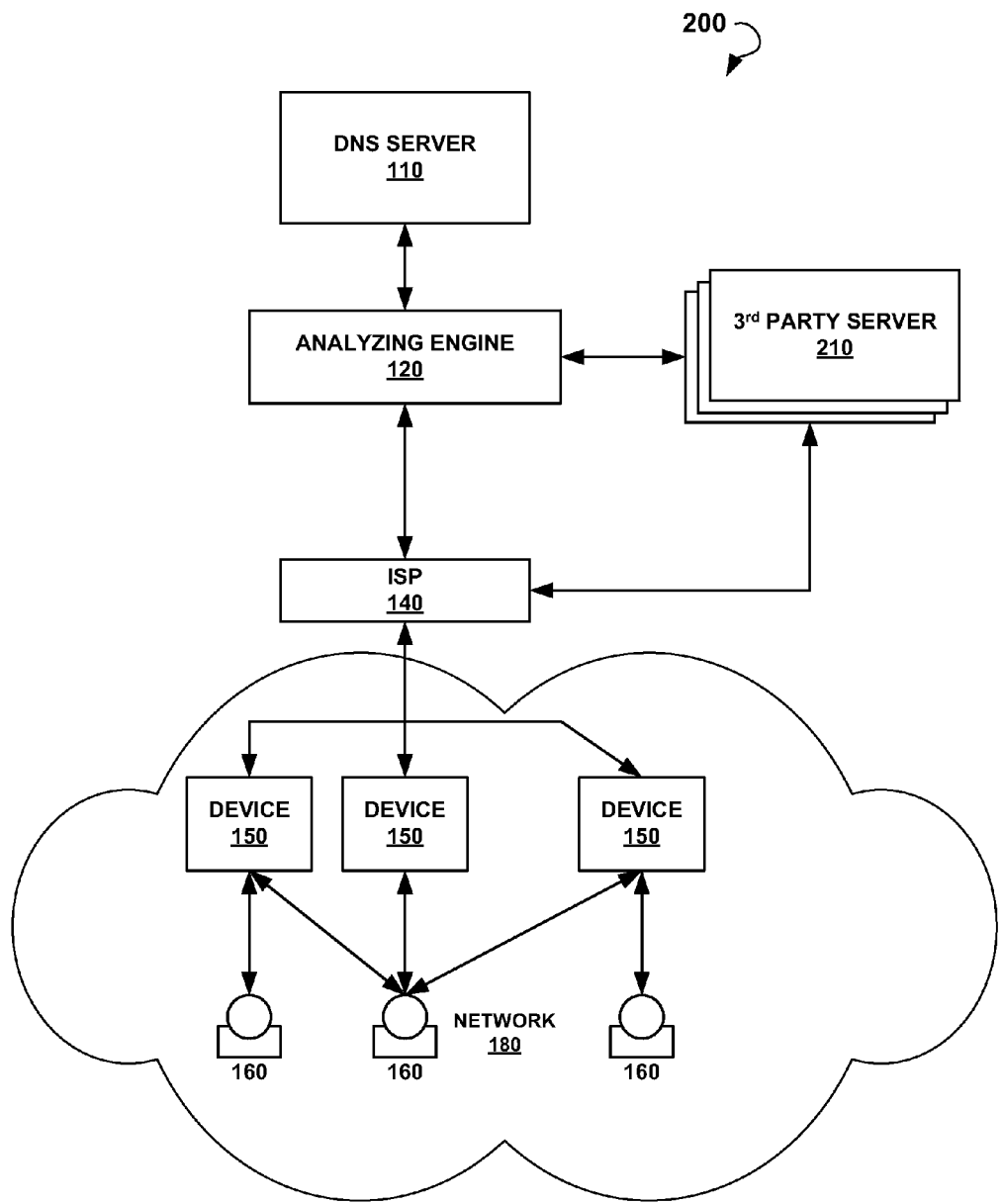
FIG. 2 is a block diagram of an ISP environment.

FIG. 2 is a block diagram of an ISP environment 200. It includes a third party server 210, which may be used for supplying content to networked devices 150 based on web addresses received from networked device 150. In other words, the third party server 210 may be a content server. However, the third party server 210 may also be a different type of server, such as a system operated by marketing researchers. While the content servers know the IP addresses that send requests for their content (i.e., the IP address associated with network 180), each content server only knows about requests sent to that particular content server and not about other requests. This limited information may still be valuable, but it is clearly less valuable than the comprehensive information available at the ISP level. For example, a content provider may be interested in knowing what other servers a user visits and how frequently. This information may be requested by third party server 210 from analyzing engine 120. A monetary scheme may be implemented for this information exchange.

Figure 3:
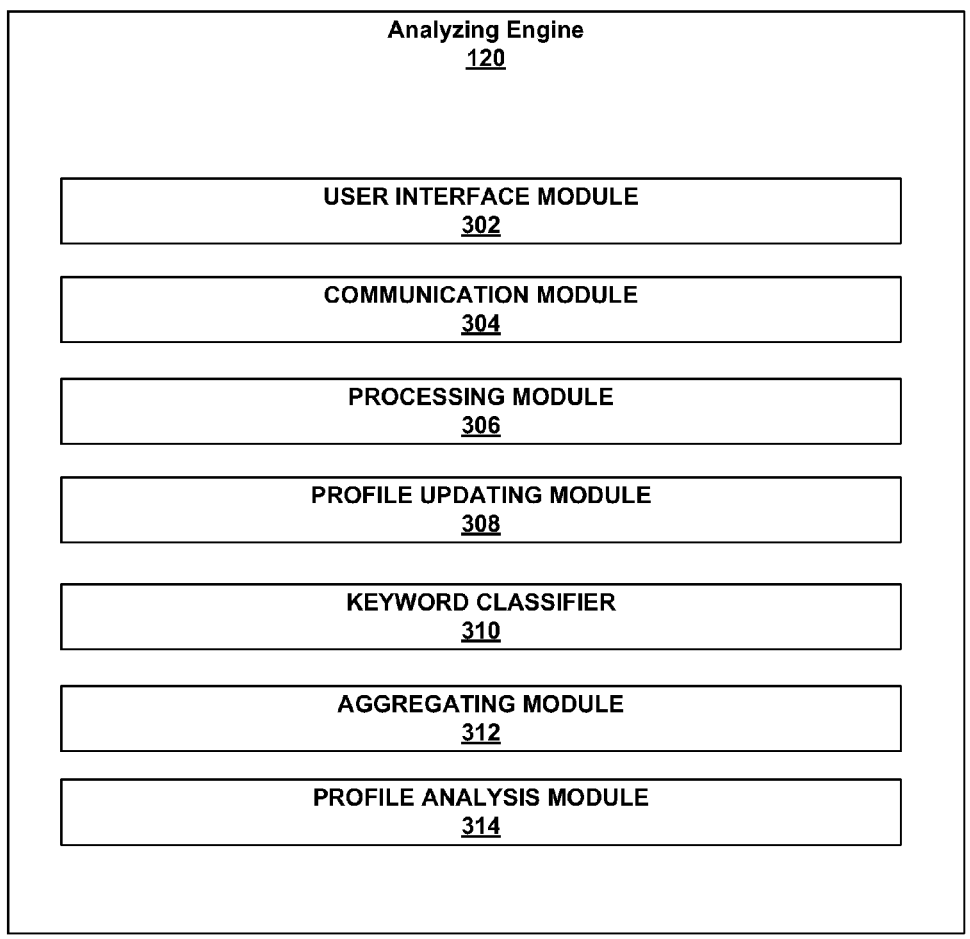
FIG. 3 is a block diagram of a system for analyzing web address system requests.

FIG. 3 is a block diagram of the analyzing engine 120. Alternative embodiments of the analyzing engine 120 may include more, fewer, or functionally equivalent modules. In some exemplary embodiments, the analyzing engine 120 includes a user interface module 302, a communication module 304, a processing module 306, a profile updating module 308, a keyword classifier 310, an aggregating module 312, and a profile analysis module 314. It will be appreciated by one of ordinary skill that examples of the foregoing modules may be virtual and when instructions are said to be executed by a module they may, in fact, be retrieved and executed by a processor. The foregoing modules may also include memory cards, servers, and/or computer discs. Although various modules may be configured to perform some or all of the various steps described herein, fewer or more modules may be provided and still fall within the scope of various embodiments.

The user interface module 302 may be configurable to establish a user interface, which may be used by users to provide web addresses. The communication module 304 can be configurable to provide a communication channel between the analyzing engine 120 and various components of the ISP environment 100 or 200, including but not limited to, networked devices 150 (through, e.g., ISP 140), DNS server 110, and/or third party server 210. Additionally, the communication module 304 may enable direct exchange of information between various modules of the analyzing engine 120.

The processing module 306 is used for analyzing content and timing of the text strings. The processing module 306 generates analysis outputs that may be fed into the profile updating module 308. The profile updating module 308 is used for updating profiles based on the analysis outputs. As explained elsewhere, each profile may be associated with the corresponding IP address. The keyword classifier 310 may be utilized to determine the type of the input received from the networked devices. The aggregating module 312 is used for developing an aggregate profile based on multiple profiles associated with different IP addresses. The profile analysis module 314 is used for performing analysis of each profile associated with the corresponding IP address based on the text string received from the networked device associated with this IP address.

In certain embodiments, the communication module 304 may receive a DNS request and in turn derive source identifying information from the DNS request. The communication module 304 may also associate the DNS request with one or more profiles based on the source identifying information. The processing module 306 may analyze characteristics of the DNS request and generate analysis output. The profile updating module 308 may in turn update one or more profiles based on the analysis output.

The communication module 304 may further receive a response to a DNS request. The processing module may analyze the response to the DNS request, and in turn generate an analysis output based upon its analysis of the response to the DNS request. The profile updating module 308 may then update one or more user profiles based on the analysis output.

Figure 4:
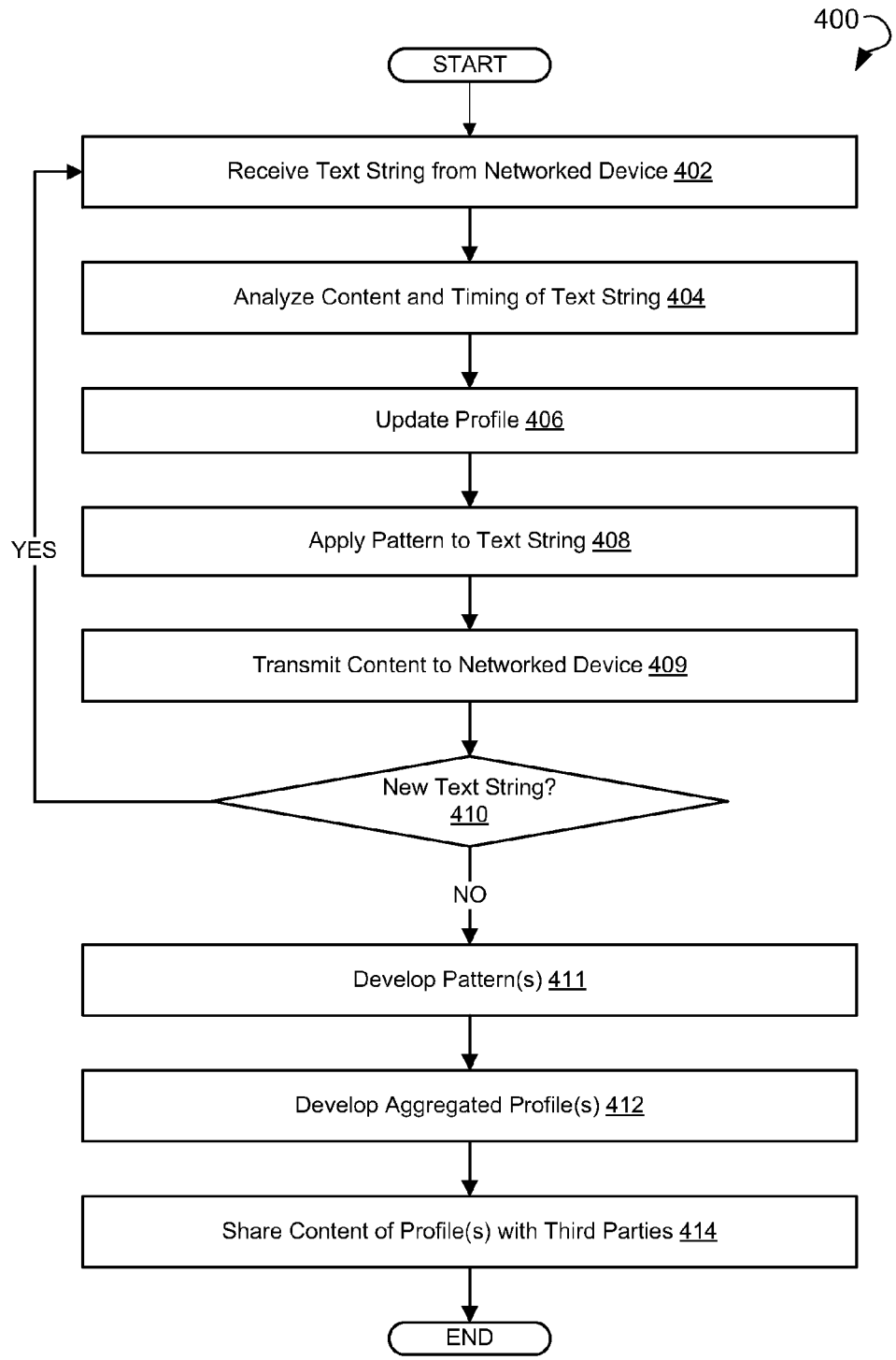
FIG. 4 illustrates a flow chart of a method for analyzing web address system requests.

FIG. 4 illustrates a process flowchart corresponding to method 400 for analyzing web address system requests. Method 400 may commence with receiving a text string from a networked device associated with an IP address during operation 402. The text string may be associated with a web address. That is, the text string may contain a protocol or formatting for transmitted data (e.g., http://, ftp://), name of the server (e.g., www), domain name including a top level domain (e.g., .com, .net, .org, .gov) and country code (e.g., uk, au, ca), path on the server, and file name. Each one of these components of a web address provides valuable information that is analyzed in the next operation.

As described above, the system used to execute method 400 only recognizes the IP address associated with the text string. This IP address may be assigned by an ISP or may be assigned in some other way, and may be shared by multiple networked devices. The system may not specifically know which one of these devices associated with the same IP address was used to send a text string. However, the following operations may be able to associate this text string with a particular device and/or user.

Method 400 may proceed with analyzing content and timing of the text string receipt during operation 404. This analysis generates analysis output that is used for future operations, such as updating a profile associated with the IP address. In some embodiments, the text string and corresponding time string may be added to the weblog corresponding to this IP address. In the same or other embodiments, the text string is subjected to categorization based on its content. For example, the protocol portion of the web address may be used to determine whether the text string was intended to download the file or surf the web. The relative frequencies of these activities may be estimated.

The domain name portion of the string may be analyzed to determine what type of the networked device is attempting to retrieve a website. For example, an operating system or application installed on the networked device may be looking for updates and may go to specific websites (e.g., Microsoft, Apple, McAfee). This information may be used to identify a specific operating system (or application), its version, and other related information. A profile of each networked device associated with the IP address may be built in this way. In some embodiments, the system may be able to discriminate among different devices associated with the same IP address based on a unique finger print (e.g., a type of operating system) of each device. For example, the system may distinguish between set top box operating systems and mobile operating systems.

The domain name portion of the string may be used to determine what type of content a user is trying to obtain. For example, a user may be looking for a new car by visiting car websites, such as www.cars.com, www.carsdirect.com, and the like. The types of requests, their frequency, duration at each website, and other factors may be collectively analyzed to determine specific interest. For example, the system may determine that a user is looking for a new car and not a used car, a specific model of the car, a price range, intended purchase date, level of interest, and other such information. This information may be used to provide more tailored content to the user (e.g., provide relevant information first), share this information with third party providers (e.g., car dealerships), and update the user profile with this information for further analysis (e.g., to determine whether this user can, in fact, afford a new car in this price range).

The information may be analyzed using a variety of metrics. In some embodiments, the system allows third party users to develop their algorithms for analyzing information. For example, a retailer (e.g., Macy) may be interested in demographic information of users (e.g., visiting its website and websites of its competitors), online shopping behavior (e.g., previous price comparisons, etc.), previous visits, and the like. The system may provide an interface and service to the third party users to develop their algorithms.

Method 400 may proceed with updating one or more profiles associated with the IP address during operation 406. This updating operation may be based on the analysis output generated during operation 404. In some embodiments, the entire text string and time stamp is added to the weblog. The weblog may be used for future analysis. In the same or other embodiments, specific categories of the profile may be updated. For example, a profile may include various metrics identifying particular computer systems, software applications, and users. Computer system metrics may include types of computer system (e.g., set top box, laptop, tablet, mobile device, gaming console, and the like). Application software metrics may include supplier, type of software, specific software title, version of the software, and the like. User metrics may be associated with user status (e.g., demographic information), user behavior and interest (shopping, news, movies, cars, sports), and the like. These metrics may be present or dynamically added based on the analysis output received from the previous operation.

In some embodiments, a profile may reflect a device type associated with the IP address, a number of devices associated with the IP address, an application installed on one or more devices associated with the IP address, a geographic location of the networked device, and one or more user profiles associated with the IP address. The user profile may include one or more of behavior profile, demographic profile, and interest profile. As noted above, the same IP address may correspond to multiple user profiles. That is, multiple users may be communicating through the same ISP account and/or hardware that define the IP address. The same applies to multiple computer systems that may share the same IP address. A simple example may help to clarify this one-to-many dependence. A household may have the same ISP account and share the same modem and/or router for multiple computer systems. There may be multiple users in this household. Some computer systems may be exclusively used by one of the users, while others may be shared by multiple users. Even though all text strings received from this household may be associated with the same IP address, multiple profiles may be set up based on the analysis of text strings received from this household. Some external information may be used to set up these profiles initially and to update the profiles later. For example, a user may be presented with a questionnaire to fill in.

Setting up multiple profiles for the same IP address may start with setting up an initial profile (e.g., a general profile). Then, based on an analysis of text strings received from this profile, this initial profile may be split into more specific profiles (e.g., one for each computer system and one for each user). There may be some dependencies or relationships established between different profiles (e.g., which computer system belongs to which user).

In some embodiments, method 400 may involve applying a pattern to a text string during operation 408. This pattern application may be used to predict future behavior of the user. For example, weblogs associated with this or other profiles may be analyzed to determine other events that lead to a certain event of interest (e.g., a purchase of a particular item). In other words, a pattern may be a behavior model developed for particular predictions. The system associated with this method may use these patterns to influence behavior of a user by supplying tailored content. These patterns or behavior models may be as simple as predictions of click patterns based on previous visits, or they may take more a holistic approach based on various information from the profile, such as demographic information and behavioral information.

Patterns may be also used for suggesting content, prefetching content, and auto-filling forms. For example, the system may predict with some degree of certainty what content the user will request next based on the stream of the previous text string. The system may then instruct the corresponding server to fetch this content even prior to the user requesting this content. In this example, the user's web browsing experience may be a lot smoother. If the pattern incorrectly predicted the future behavior, the prefetched content is discarded while the pattern itself may be updated for more accuracy in the future.

Method 400 may also involve transmitting content back to the networked device during operation 409. The content may be selected based on the analysis output and may be in the form of a banner ad and/or an e-mail. It should be noted that the content transmitted during operation 409 is different from the content requested when the networked device provided the web address. The content transmitted during operation 409 may be transmitted immediately after analyzing the content and timing of the text string or at some later time. Furthermore, in some embodiments, the content is not transmitted to the same networked device that provided the text string but to some other device, such as a third party provider or another networked device (which may be or may not be associated with the IP address of the networked device that provided the text string).

Method 400 may involve repeating at least the receiving, analyzing, and updating profile operations as reflected by decision block 410. These steps may be repeated for each of new text strings received from the networked device. In some embodiments, multiple strings are pooled together prior to initiating another cycle. As such, one or more profiles may be continuously updated while new text strings are being supplied. The type of analysis performed in each cycle may be different based on content and timing of each new text string and current state of profile. For example, text strings associated with software updates may be processed in accordance with one set of algorithms, while text strings associated with human behavior may be processed using different algorithms.

These operations may be repeated for a new text string received from a different networked device. This different networked device may be associated with the same or different IP address. If the different device is associated with the different IP address, then a different profile is updated during this repeat cycle. However, if the different device is associated with the same IP address, then the same or a different profile may be updated during this repeat cycle. As stated above, multiple networked devices may share the same IP address (e.g., multiple computers in the same household). The system may be capable of differentiating between these devices based on content and/or timing of the text string. Furthermore, the system may be used to service multiple IP addresses in a parallel manner.

Method 400 may involve developing patterns during operation 411. These patterns are then used during operation 408 described above. Patterns may be developed based on analyzing text strings associated with these and other IP addresses. For example, the system may focus on a particular result (e.g., a sale of a particular product) and then analyze events represented by text strings that led to this particular result.

Each IP address is typically associated with at least one profile. Higher level aggregated profiles may be created from lower level profiles based on some commonalities (e.g., demographic information, interests, computer system types, operating systems, and the like) as reflected in FIG. 4 by operation 412. The aggregate profiles may be created to serve the particular needs of third parties that may be interested in aggregating certain information in order to get marketing information and other such needs.

Method 400 may also involve sharing content of the profile with a third party during operation 414. As stated above, this information may valuable for internet marketing, understanding users' behavior, and other purposes. This information may be packaged to address specific needs of the users.

Figure 5:
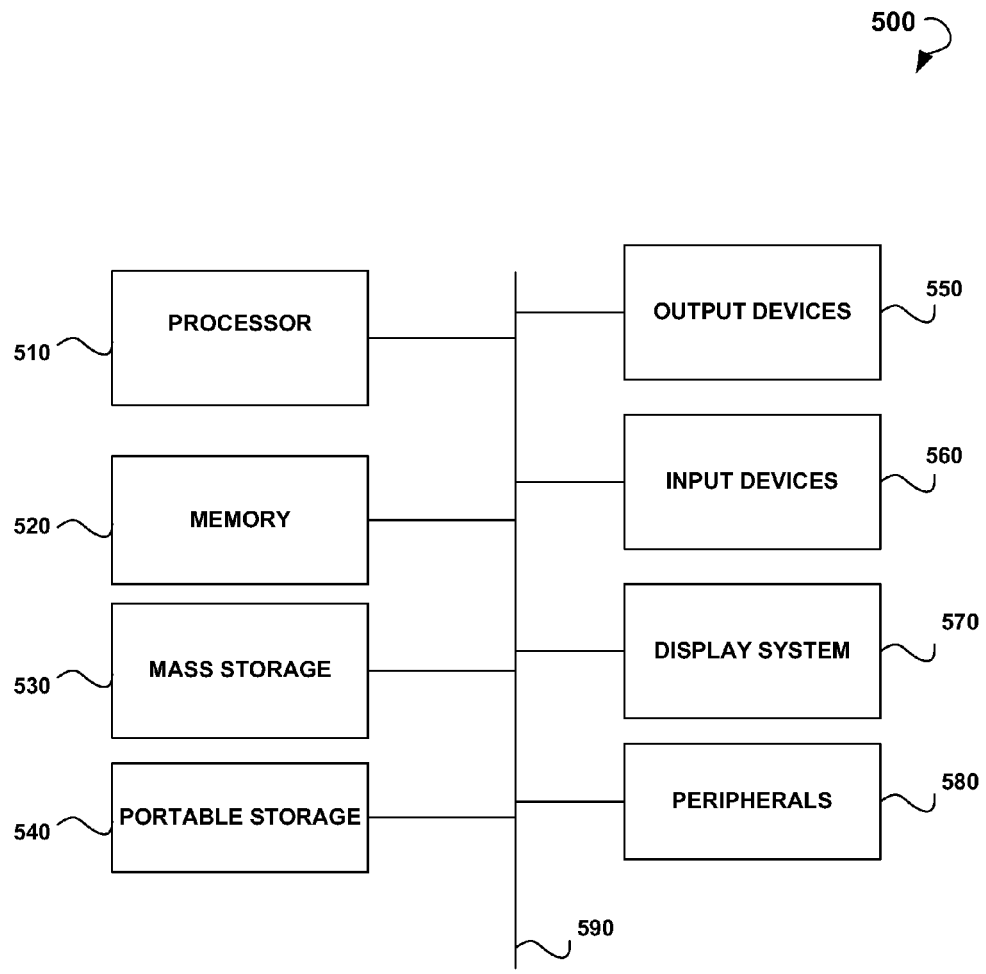
FIG. 5 is a computer system that may be used to implement the methods for analyzing DNS requests.

FIG. 5 illustrates an exemplary computing system 500 that may be used to implement embodiments described herein. System 500 of FIG. 5 may be implemented in the contexts of the likes of client devices 150, the DNS server 110, and the network 180. The computing system 500 of FIG. 5 may include one or more processors 510 and memory 520.

Memory 520 stores, in part, instructions and data for execution by processor 510. Memory 520 can store the executable code when the system 500 is in operation. The system 500 of FIG. 5 may further include a mass storage device 530, portable storage medium drive(s) 540, output devices 550, user input devices 560, a display system 570, and other peripheral devices 580.

The components shown in FIG. 5 are depicted as being connected via a single bus 590. The components may be connected through one or more data transport means. Processor 510 and memory 520 may be connected via a local microprocessor bus, and the mass storage device 530, peripheral device(s) 580, portable storage device 540, and display system 570 may be connected via one or more input/output (I/O) buses.

Mass storage device 530, which may be implemented with a magnetic disk drive or an optical disk drive, is a non-volatile storage device for storing data and instructions for use by a magnetic disk or an optical disk drive, which in turn may be used by processor 510. Mass storage device 530 can store the system software for implementing embodiments described herein for purposes of loading that software into memory 520.

Portable storage medium drive(s) 540 operates in conjunction with a portable non-volatile storage medium, such as a floppy disk, compact disk (CD), or digital video disc (DVD), to input and output data and code to and from the computer system 500 of FIG. 5. The system software for implementing embodiments described herein may be stored on such a portable medium and input to the computer system 500 via the portable storage medium drive(s) 540.

Input devices 560 provide a portion of a user interface. Input devices 560 may include an alphanumeric keypad, such as a keyboard, for inputting alphanumeric and other information, or a pointing device, such as a mouse, a trackball, a stylus, or cursor direction keys. Additionally, the system 500 as shown in FIG. 5 includes output devices 550. Suitable output devices include speakers, printers, network interfaces, and monitors.

Display system 570 may include a liquid crystal display (LCD) or other suitable display device. Display system 570 receives textual and graphical information and processes the information for output to the display device.

Peripherals 580 may include any type of computer support device to add additional functionality to the computer system. Peripheral device(s) 580 may include a modem or a router.

The components contained in the computer system 500 of FIG. 5 are those typically found in computer systems that may be suitable for use with embodiments described herein and are intended to represent a broad category of such computer components that are well known in the art. Thus, the computer system 500 of FIG. 5 can be a PC, hand held computing device, telephone, mobile computing device, workstation, server, minicomputer, mainframe computer, or any other computing device. The computer can also include different bus configurations, networked platforms, multi-processor platforms, and so forth. Various operating systems (OS) can be used including UNIX, Linux, Windows, Macintosh OS, Palm OS, and other suitable operating systems.

Some of the above-described functions may be composed of instructions that are stored on storage media (e.g., computer-readable medium). The instructions may be retrieved and executed by the processor. Some examples of storage media are memory devices, tapes, disks, and the like. The instructions are operational when executed by the processor to direct the processor to operate in accord with the invention. Those skilled in the art are familiar with instructions, processor(s), and storage media.

It is noteworthy that any hardware platform suitable for performing the processing described herein is suitable for use with the invention. The terms "computer-readable storage medium" and "computer-readable storage media" as used herein refer to any medium or media that participate in providing instructions to a Central Processing Unit (CPU) for execution. Such media can take many forms, including, but not limited to, non-volatile media, volatile media, and transmission media. Non-volatile media include, for example, optical or magnetic disks, such as a fixed disk. Volatile media include dynamic memory, such as system random access memory (RAM). Transmission media include coaxial cables, copper wire, and fiber optics, among others, including the wires that include one embodiment of a bus. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic medium, a CD-read-only memory (ROM) disk, DVD, any other optical medium, any other physical medium with patterns of marks or holes, a RAM, a PROM, an EPROM, an EEPROM, a FLASHEPROM, any other memory chip or cartridge, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents.

While the present invention has been described in connection with a series of preferred embodiments, these descriptions are not intended to limit the scope of the invention to the particular forms set forth herein. It will be further understood that the methods of the invention are not necessarily limited to the discrete steps or the order of the steps described. To the contrary, the present descriptions are intended to cover such alternatives, modifications, and equivalents as may be included within the spirit and scope of the invention as defined by the appended claims and otherwise appreciated by one of ordinary skill in the art. For instance, although this description describes the technology in the context of a DNS Resolver, it will be appreciated by those skilled in the art that an ISP may be utilized with this invention instead or in conjunction with a DNS Resolver. Functionalities and method steps that are performed by a DNS Resolver may be performed by an ISP. Furthermore, one skilled in the art will appreciate that the term "Internet content" comprises one or more web sites, domains, web pages, web addresses, hyperlinks, URLs, any text, pictures, and/or media (such as video, audio, and any combination of audio and video) provided or displayed on a web page, and any combination thereof.

The invention claimed is:

1. A computer-implemented method for analyzing Domain Name System (DNS) requests, the method comprising:
  receiving a DNS request;
  deriving source identifying information from the DNS request;
  associating the DNS request with one or more profiles based on the source identifying information;
  analyzing characteristics of the DNS request and generating analysis output; and
  updating the one or more profiles based on the analysis output, in which the one or more profiles characterize one or more of a behavior, demographics, and an interest.

2. The computer-implemented method of claim 1, further comprising:
  receiving a response to the DNS request;
  analyzing the response, wherein the analyzing generates analysis output; and
  updating the one or more profiles based on the analysis output.

3. The computer-implemented method of claim 1, wherein the one or more profiles are associated with one or more of a device, a geographical location of the device, an Internet Protocol (IP) address of the device, one or more users associated with the IP address, an organization, a User Identification (ID), a Domain Name address, a network, a geographical location, a system, an Internet Service Provider (ISP), a particular list, a device ID, a time, a proximity, a subscriber ID, an address space, a device, a number of devices associated with the IP address, an application installed on one or more devices associated with the IP address.

4. The computer-implemented method of claim 1, wherein the characteristics include one or more of a content, a timing, a temporal relationship of the DNS request to one or more further DNS requests, and a pattern.

5. The computer-implemented method of claim 1, wherein the DNS request includes a text string.

6. The computer-implemented method of claim 5, wherein the text string includes a domain name.

7. The computer-implemented method of claim 6, wherein the one or more profiles include one or more aggregate profiles.

8. A computer-implemented system for analyzing Domain Name System (DNS) requests, the system comprising:
   a communication module for receiving a DNS request, deriving source identifying information from the DNS request, associating the DNS request with one or more profiles based on the source identifying information;
   a processing module for analyzing characteristics of the DNS request and generating analysis output; and
   a profile updating module for updating the one or more profiles based on the analysis output, in which the one or more profiles characterize one or more of a behavior, demographics, and an interest.

9. The system of claim 8, further comprising:
   the communication module receiving a response to the DNS request;
   the processing module analyzing the response, wherein the analyzing generates analysis output;
   the profile updating module updating the one or more profiles based on the analysis output.

10. The system of claim 8, wherein the one or more profiles are associated with one or more of a device, a geographical location of the device, an Internet Protocol (IP) address of the device, one or more users associated with the IP address, an organization, a user identification (ID), a Domain Name address, a network, a geographical location, a system, an Internet Service Provider (ISP), a particular list, a device ID, a time, a proximity, a subscriber ID, an address space, a device, a number of devices associated with the IP address, an application installed on one or more devices associated with the IP address.

11. The system of claim 8, wherein the characteristics include one or more of a content, a timing, a temporal relationship of the DNS request to one or more further DNS requests, and a pattern.

12. The system of claim 8, wherein the DNS request includes a text string.

13. The system of claim 12, wherein the text string includes a domain name.

14. The system of claim 13, wherein the one or more profiles include one or more aggregate profiles.

15. A machine-readable non-transitory medium comprising instructions, which when implemented by one or more processers, perform the following operations:
    receiving a DNS request;
    deriving source identifying information from the DNS request;
    associating the DNS request with one or more profiles based on the source identifying information;
    analyzing characteristics of the DNS request and generating analysis output; and
    based on the analysis output, updating the one or more profiles, in which the one or more profiles characterize one or more of a behavior, demographics, and an interest.

16. The machine-readable non-transitory medium of claim 15, further performing the operations:
    receiving a response to the DNS request;
    analyzing the response, wherein the analyzing generates analysis output; and
    updating the one or more profiles based on the analysis output.

17. The machine-readable non-transitory medium of claim 15, wherein the one or more profiles are associated with one or more of a device, a geographical location of the device, an Internet Protocol (IP) address of the device, one or more users associated with the IP address, an organization, a User Identification (ID), a Domain Name address, a network, a geographical location, a system, an Internet Service Provider (ISP), a particular list, a device ID, a time, a proximity, a subscriber ID, an address space, a device, a number of devices associated with the IP address, an application installed on one or more devices associated with the IP address.

18. The machine-readable non-transitory medium of claim 15, wherein the characteristics include one or more of a content, a timing, a temporal relationship of the DNS request to one or more further DNS requests, and a pattern.

19. The machine-readable non-transitory medium of claim 15, wherein the DNS request includes a text string.

20. The machine-readable non-transitory medium of claim 19, wherein the text string includes a domain name.

21. The machine-readable non-transitory medium of claim 20, wherein the one or more profiles include one or more aggregate profiles.

\* \* \* \* \*